Feb. 23, 1954 P. J. HEIN 2,669,792
TRENCHING MACHINE ADJUSTMENT FOR DIGGING CONVEYERS
Filed May 29, 1947 2 Sheets-Sheet 1

INVENTOR.
PETER J. HEIN, DECEASED
BY MAGDALINA J. HEIN,
ADMINISTRATRIX

ATTORNEY

Feb. 23, 1954   P. J. HEIN   2,669,792
TRENCHING MACHINE ADJUSTMENT FOR DIGGING CONVEYERS
Filed May 29, 1947   2 Sheets-Sheet 2
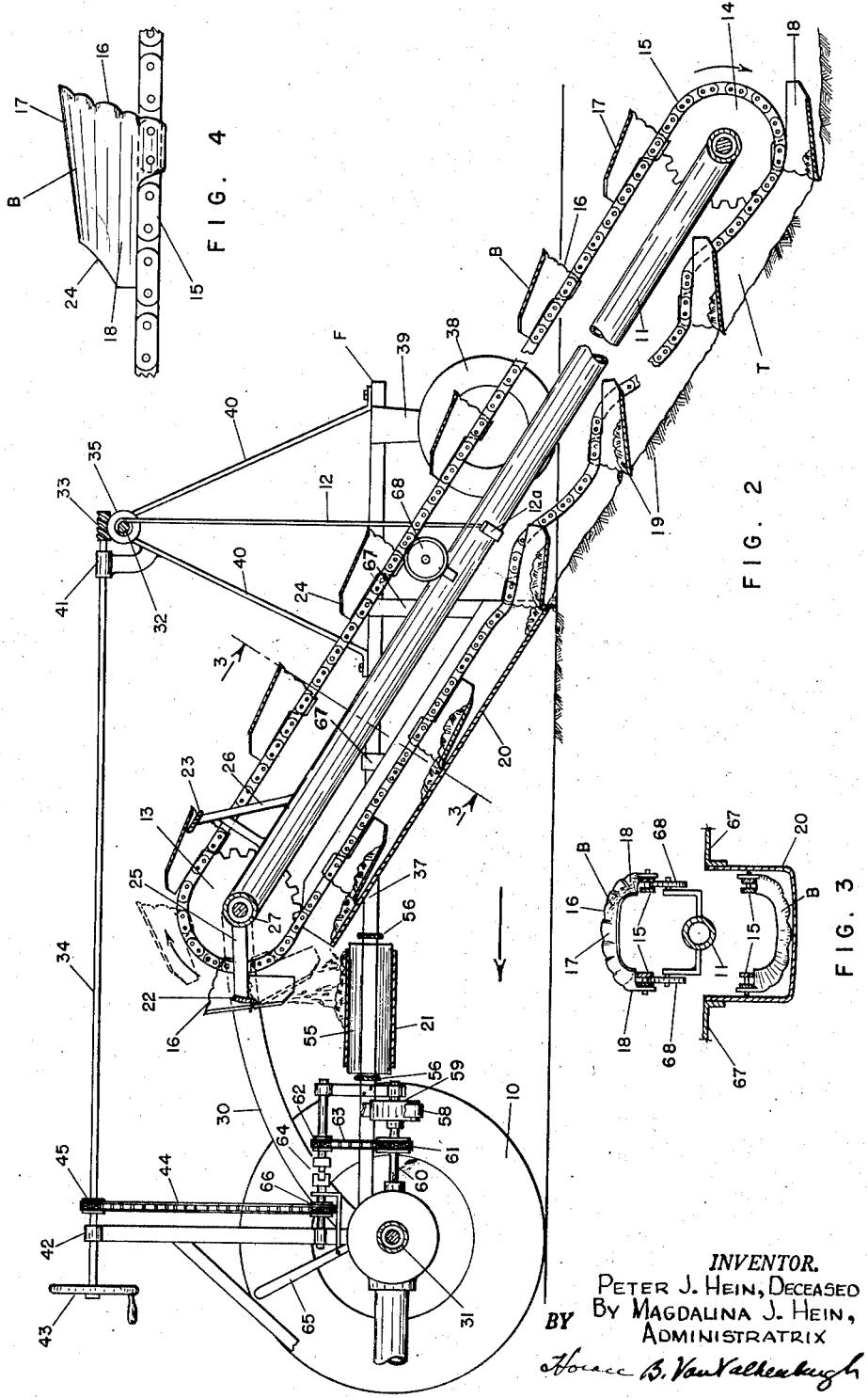
INVENTOR.
PETER J. HEIN, DECEASED
BY BY MAGDALINA J. HEIN,
ADMINISTRATRIX
ATTORNEY Patented Feb. 23, 1954

2,669,792

UNITED STATES PATENT OFFICE 2,669,792

TRENCHING MACHINE ADJUSTMENT FOR DIGGING CONVEYERS

Peter J. Hein, deceased, late of Longmont, Colo., by Magdalina J. Hein, administratrix, Longmont, Colo.

Application May 29, 1947, Serial No. 751,181

1 Claim. (Cl. 37—90)

This invention relates to trenching machines, for digging trenches, ditches and the like.

Machines for digging ditches and trenches, as by an endless series of buckets or scrapers, which remove the earth to a predetermined depth and width, have usually operated satisfactorily in dry earth, but when wet earth or mud are encountered, the buckets or scrapers tend to clog up. This not only reduces the effectiveness and efficiency of the machine, but also at times tends to stop the machine altogether. Furthermore, such machines have not been adequately capable of depositing the removed earth at any desired point, as on either side of the trench, or have been unwieldy, bulky and cumbersome. Also, such machines, when adapted to be adjusted to dig any desired depth of trench or ditch, have been unduly complicated.

Among the objects of this invention are to provide a novel trenching machine; to provide such a machine which will dig a trench or ditch to different depths; to provide such a machine which will operate equally as well in wet or muddy ground or earth as in dry ground; to provide such a machine which will deliver the removed earth to either side of the ditch, as desired; to provide such a machine which may be mounted on a tractor or other self-propelled apparatus; to provide such a machine which may be driven from the normal power takeoffs of a tractor or the like; to provide a novel form of bucket for such a machine; and to provide such a machine which is relatively simple in construction and economical in operation.

Additional objects of this invention will become evident from the following description, taken in connection with the accompanying drawings, in which:

Fig. 1 is a top plan view of a machine constructed in accordance with this invention, and adapted to be mounted at the rear of a tractor or the like;

Fig. 2 is a vertical section taken along line 2—2 of Fig. 1, illustrating the machine digging a trench;

Fig. 3 is a transverse section taken along line 3—3 of Fig. 2; and

Fig. 4 is an enlarged side elevation of a novel bucket for trenching machines constructed in accordance with this invention.

Figure 1:
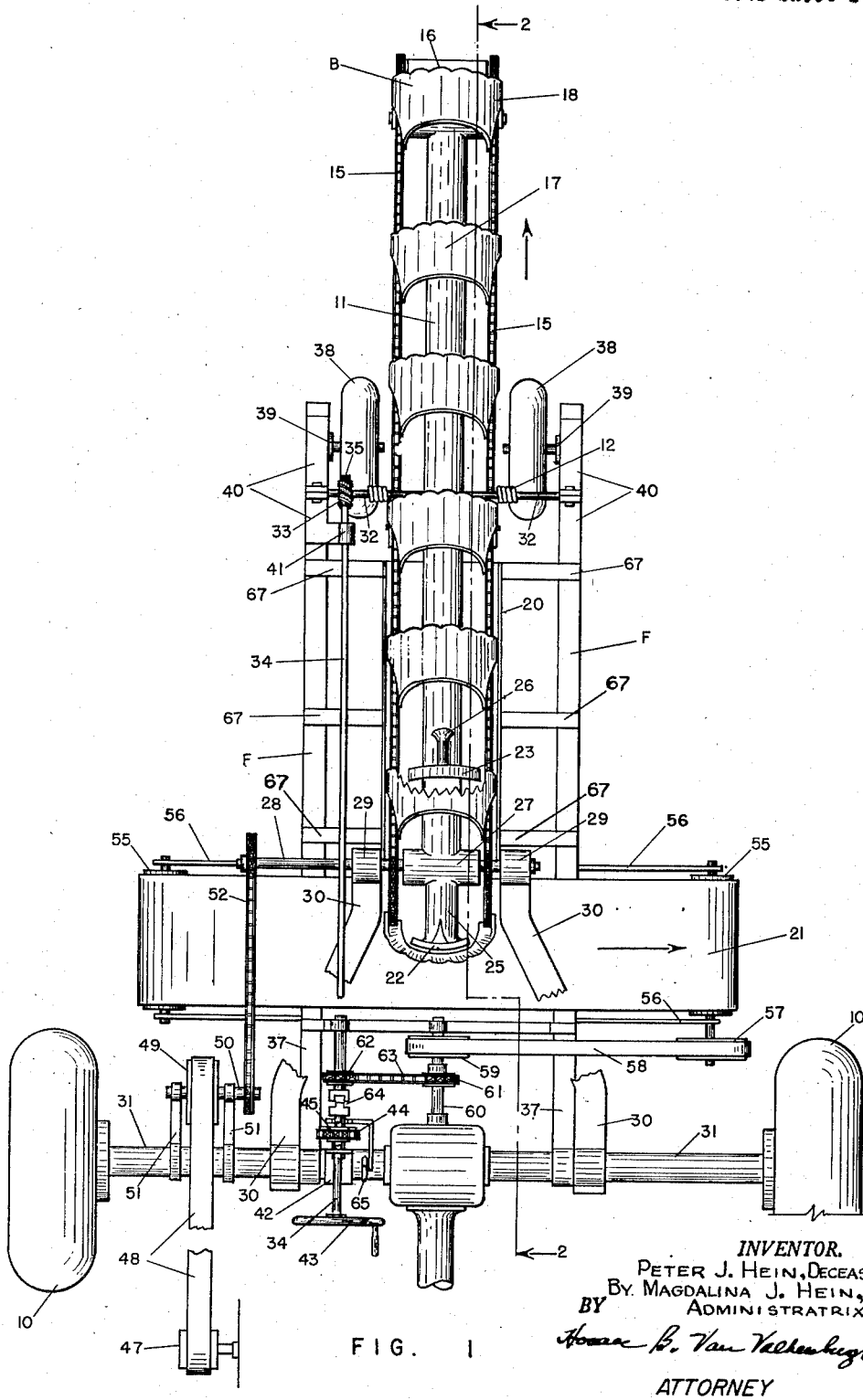

The machine of this invention, as illustrated in the drawings, includes a framework F adapted to be attached to a tractor or other propelling apparatus having rear wheels 10. A boom 11 is pivoted at its upper end on the framework F, and is adapted to be moved to any desired vertical position, being supported by cables 12 attached to brackets 12a or the like extending from the boom at each side so that cables 12 will clear buckets B. The boom 11 may be a heavy pipe, as shown, or an I-beam or the like, and is preferably sufficiently long so that for a ditch or trench six feet deep, the boom will assume approximately the angle to the horizontal shown in Fig. 2. For this purpose, a boom length of fifteen feet has been found to be highly satisfactory. However, the boom can be made longer so as to dig readily a ditch or trench eight or nine feet deep.

The boom 11 carries a pair of driving sprockets 13 rotatably mounted at its upper end, and a pair of idler sprockets 14 rotatably mounted at its lower end, for a pair of endless chains 15. Buckets B are attached between chains 15, at their front ends and in spaced positions along the chains, and each bucket B, as in Figs. 1, 3, and 4, is provided with cutting teeth 16, which may be arcuate to form a scalloped effect and are also bent outwardly from bottom 17 of the bucket as well as from each side 18. The side cutting teeth 16 extend outwardly to a distance greater than the width of chains 15, and both the bottom 17 and the sides 18 of each bucket taper from front to rear, as shown, so that teeth 16 provide substantially all contact with the earth. One result of the use of side teeth 16, observed in operation, is that the walls of the ditch appear to be smoother, and apparently become packed, since the tendency for the sides of the trench to cave in, when formed in wet ground, is considerably less than with other types of trenching machines. As shown in Fig. 2, each bucket tends to pivot or twist about the front end thereof as an axis, in removing earth from a trench T. The buckets are preferably fixedly attached to the chains, and the tendency for the sides of the bucket to abut against chains 15 tends to prevent more than a slight degree of pivotal movement, such as that shown. The width of the trench produced is determined by the distance between the side cutting teeth, and the buckets may have any desired maximum width, a suitable width for digging drainage ditches or trenches being 18 inches, such buckets forming a trench of about the same width.

In forming the trench T, each bucket, in turn, passes around lower sprockets 14 and tends to dig into the earth 19 and then scrape along the earth with a slight digging action, while in pivoted position. There is considerable give or resiliency in the chains, and the tendency for pivotal movement of the buckets causes the buckets to be substantially self-regulating in digging action. That is, the teeth 16 dig into the earth and tend to loosen the same, in accordance with the relation of the power required by a specific bucket to the power required by the other buckets which are digging at that time. Thus, if one of the buckets tends to dig in too deeply, it will tend to tip rearwardly and upwardly to a greater degree, thus tending to scrape, rather than dig, and thereby substantially automatically decrease its depth of cut. At the same time, the other buckets engaging the earth will tend to be straightened as the chains are tightened by the bucket which is tipped to a greater degree, and thereby decrease their depth of cut. While the degree of change in cut is usually less than described above, the action of the buckets B in traveling along the earth 19 is a continuous bobbing up and down, so that the buckets seldom follow a straight line path, but rather tend to deviate and return to a straight line path intermittently. Thus, bumps or rises are produced in the upward slope of earth 19, but each bucket, in turn, tends to slice off more of each bump. In other words, the upward slope of earth 19 is constantly changing, bumps or rises being produced and leveled off, and other bumps or rises are produced and then leveled off.

Each bucket B is also open at both front and rear and carries only a relatively small amount of earth within it, but also pushes an additional amount ahead of it, as onto a slide or apron 20 and then onto a conveyor belt 21, which carries the earth to either side of the machine, as desired. As each bucket swings around the upper sprockets 13, the earth within it drops rearwardly from the bucket onto belt 21. When operating in dry earth, of course, there is little tendency for the removed earth to adhere to the buckets, and the operation proceeds satisfactorily without any tendency for the buckets to become clogged. However, when the earth is wet or muddy, an entirely different situation is presented.

Particularly for working in wet earth, a scraper 22 is provided adjacent the upper end of travel of the buckets, preferably directly above belt 21, and a second scraper 23 is provided rearwardly of sprockets 13, at a position in which the buckets are again traveling in a relatively straight line. Scraper 22 is positioned so as to remove all but a small portion of the wet earth or mud from each bucket, such as all but about ½ inch, so a major portion of the mud will fall onto conveyor belt 21. The second scraper 23 is adapted to remove the remainder of the mud, as each bucket passes in substantially a straight line over it. This removed mud falls onto slide 20, or another bucket coming up the slide. Scraper 23 is curved laterally, while scraper 22 is curved both laterally and transversely, as in Figs. 1 and 2, the former to fit the contour of the bucket and the latter to accommodate the arc through which the bucket swings as it is passing around upper sprockets 13.

In further accordance with this invention, the rear of each bucket is provided with a cutout 24, which permits the scrapers 22 and 23 to operate effectively. Thus, cutout 24 not only accommodates the swing of the bucket as it simultaneously passes around driving sprockets 13 and past scraper 22, but also permits scraper 23 to pass through the bucket without hitting the narrow rear end. Scraper 22 may be mounted on an arm 25 extending forwardly from boom 11, while scraper 23 may be mounted on an arm 26 extending upwardly from boom 11.

An upper bearing 27 forms an upper support for boom 11, and also the bearing for a shaft 28 on which driving sprockets 13 are mounted. Shaft 28 also rotates in bearings 29 disposed at the upper ends of brackets 30, which may be attached to rear axle housing 31 of the tractor, as in Fig. 1, and which extend upwardly and rearwardly therefrom. Cables 12 are wound about a rod 32, which may be turned through a worm 33 mounted on the rear end of an adjusting rod 34, and engaging a worm gear 35 on cable rod 32.

The framework F may include a pair of beams 37, attached at their front ends to the rear axle housing 31 of the tractor, and supported at their rear ends by wheels 38 mounted on wheel supports 39, which may be made adjustable, if desired. Cable rod 32 is mounted for rotation and support at the upper ends of brackets 40, in turn tends through a bearing 41 mounted on one of mounted on beams 37, while adjusting rod 34 extends the brackets 40. The forward end of adjusting rod 34 also extends through a suitable bearing at the upper end of a bracket 42, attached to the rear axle housing 31. As will be evident from Figs. 1 and 2, the position of boom 11 may be adjusted by hand through rotation of a handwheel 43 mounted on the forward end of adjusting rod 34. When desired, and particularly when the boom 11 is to be lifted when a ditch or trench is completed, and it is desired to move the machine to another position, the boom may be elevated by a power drive which includes a chain 44 and a sprocket 45 mounted on adjusting rod 34, in a manner described later.

The drive sprockets 13, and with them chains 15 and buckets B, may be driven from the usual side power takeoff pulley 47 of the tractor, as in Fig. 1, a belt 48 extending over pulley 47 and a transmission pulley 49 mounted on a shaft 50, which rotates in bearings at the upper ends of brackets 51, also mounted on rear axle 31. From shaft 50, the power is transmitted through a chain 52, which passes over suitable sprockets mounted on shaft 50 and sprocket shaft 28, speed reduction preferably being obtained therein, as well as between pulleys 47 and 49. The side power takeoff pulley 47 is preferably run at a relatively slow speed, so that the movement of buckets B is not too fast, being about 20 to 40 feet per minute, although other speeds may be utilized, if desired.

Conveyor belt 21 moves about rollers 55, mounted at the outer ends of brackets 56 which extend laterally from beams 37, one of the rollers 55 being driven by a pulley 57. Pulley 57 is driven by a belt 58 passing thereover and over a rear power takeoff pulley 59 mounted on the usual rear power takeoff shaft 60, which is also provided with a sprocket 61 to drive a clutch sprocket 62 by means of a chain 63. A clutch 64, operated by a handle 65, is driven by clutch sprocket 62, and, in turn drives a lifting sprocket 66, over which passes chain 44. As will be evident, when clutch 64 is thrown in, adjusting rod 34 will be rotated to elevate boom 11. It is normally necessary to provide for power rotation of adjusting rod 34 in only one direction, since it is a relatively easy matter to turn handwheel 43 to lower the boom 11, whereas a considerably greater amount of power is required to elevate the boom. Also, it will be understood that a gear transmission, or other equivalent means, may be substituted for clutch 64 and its associated parts.

Apron or slide 20 is mounted on frame F by supporting bars 67, which may be formed integrally with the slide and attached to beams 37, while one or more sets of rollers 68 may be mounted above the boom to support chains 15 and buckets B mounted thereon, as they move downwardly along the boom. To counter-balance the weight of the machine mounted on the rear thereof, a suitable counterweight (not shown), placed on a platform provided for that purpose, may be mounted on the front end of the tractor.

During operation of the machine, the tractor is not driven forward until the boom 11 is lowered to the depth of ditch required. Thus, the side power takeoff is thrown in for rotating sprockets 13 and moving the buckets B around the boom. The boom is lowered by handwheel 43, and as the buckets B begin to dig into the earth, each bucket pulls a portion of the removed earth upward with it. The lowering of the boom is continued until the full depth of ditch desired is obtained. During this time, the buckets B gradually move an increasing amount of earth towards and then up the apron 20, the buckets pushing dirt up the apron, as well as carrying earth inside them. The conveyor belt 21 is, of course, started prior to or as soon as any earth begins to be deposited by the buckets thereon. As the buckets fill with earth during movement up the slope of earth 19, they will of course contain more earth when in the more nearly horizontal digging position, than in the rearwardly inclined position during movement over slide 20. Thus, some earth will tend to spill out of the rear end of each bucket as it begins to move up the slide. However, the next bucket will tend to pick up the earth spilled out of the preceding bucket, and push this earth up the slide, which also acts as a scraper on the bottom of the buckets. The problem of maintaining the bottoms of the buckets clean, when operating in mud or wet earth, is not as serious as keeping the interior of the buckets clean, since any mud adhering to the bottom tends to be scraped off as each bucket moves around the lower sprockets 14 and engages the earth.

As soon as the depth of ditch desired is obtained, the tractor is started forwaard at a relatively slow speed, such as about 2 feet per minute, and the digging operation continues. As the tractor and machine move along at this relatively slow speed, the buckets continue to carry earth up slide 20 and deposit it upon conveyor belt 21, which moves it to the side of the ditch.

From the foregoing, it will be apparent that the trenching machine of this invention fulfills to a marked degree the objects and requirements hereinbefore set forth. The machine is relatively simple in construction, yet it is readily adjusted to dig any desired depth of trench, and also operates equally as well in wet or muddy earth, as in dry earth. The combination of scrapers 22 and 23 with cooperating cutout portions 24 at the rear edge of the buckets B, contribute considerably to successful operation in mud, while buckets open at both ends permit the scrapers 22 and 23 to pass through the inside of each bucket. The taper of the bottom and sides of the buckets permits more effective earth engagement by teeth 16, provide clearance for each bucket as it passes through the trench, and also permits the side edges, at the rear, to abut against the chains, to equalize digging action during passage through the trench and to support the buckets as they pass downwardly along the top of boom 11. Clearance in the trench, adequate mud removal, and apparently packed side walls of the trench contribute to successful operation in wet and muddy earth. The problem of digging drainage ditches is normally rendered more difficult by the fact that the ground is usually wet or muddy, but the machine of this invention is particularly adapted to dig a desired ditch through wet or muddy ground without difficulty.

The conveyor belt 21 will deliver the removed earth to either side of the ditch, as desired, since the rear power takeoff shaft 60 may be driven in either direction, as is conventional in tractors and the like. The slide or apron 20 also contributes to the effectiveness and economy of operation of the machine, since it provides a path or guide for the earth being pushed upwardly by the buckets B. The rigid attachment of the buckets to the chains, at the front ends of the buckets, further contributes to the successful operation of the machine, since the chains permit the buckets to pivot during digging, and also causes the removal of earth to be equalized between the various buckets, as in the manner previously described. Although the machine and the buckets are preferably moved at a relatively slow rate, a surprising amount of earth is removed by the buckets in a relatively short period of time, and this earth is neatly piled to the side of the ditch by the conveyor belt 21.

It will be understood that various changes may be made in the construction shown. The machine may be mounted on a tractor in the manner illustrated or a special machine may be built for this purpose, so that various equivalent structures may be substituted for the tractor and/or the framework F. Also, the boom may be supported and/or raised and lowered in a different manner, and upper sprockets 13 may be driven in a different way.

It will further be understood that additional changes may be made, all without departing from the spirit and scope of this invention.

What is claimed is:

A trenching machine comprising a chassis frame having a pair of longitudinal beams attached at their front ends to the rear axle housing of a tractor or the like and supported thereby, said chassis frame having a pair of supporting wheels for supporting the same at a location adjacent the rear ends of the longitudinal beams, a pair of upwardly converging arms carried by said axle housing extending rearwardly from the housing, said supporting wheels being adapted to move along each side of a trench to be excavated by said trenching machine, bearings disposed at the rear ends of said arms, a shaft extending through said bearings and interconnecting the arms, a boom swingably mounted upon said shaft between said bearings and at a point substantially above ground level, bracket members carried by and extending upwardly from the rear end portions of the longitudinal beams, a revolvable shaft journaled in and interconnecting the upper end portions of the brackets, means connecting the revolvable shaft and an intermediate portion of said boom to support the boom and to raise and lower the same, a pair of drive sprockets at the upper end of the boom carried by the arms-supported shaft, a pair of idler sprockets at the lower end of said boom, said tractor or the like having a power take-off, drive means from said power takeoff connected to said arms supported shaft for rotating said drive sprockets and said arms-supported shaft, drive means from said power takeoff for rotating said revolvable shaft, bearing means providing the swingable connection between the upper end of the boom and the said arms-supported shaft, a pair of endless chains extending around said sprockets for drivingly connecting the same, a series of earth removing open-ended buckets mounted in spaced positions on said chains, a transversely extending conveyor mounted on said chassis frame above ground level but adjacent and below the upper end of said boom, and a slide depending from said chassis frame beneath the path of travel of said open-ended buckets and extending substantially from ground level to said transverse conveyor.

MAGDALINA J. HEIN,
*Administratrix of the estate of Peter J. Hein, deceased.*

References Cited in the file of this patent

UNITED STATES PATENTS

| Number | Name | Date |
|---|---|---|
| 673,920 | McKee | May 14, 1901 |
| 717,530 | Bentson | Jan. 6, 1903 |
| 828,208 | Hill | Aug. 7, 1906 |
| 867,047 | Junkin | Sept. 24, 1907 |
| 931,763 | Humphreys | Aug. 24, 1909 |
| 1,052,972 | Sargent | Feb. 11, 1913 |
| 1,081,454 | Krupp | Dec. 16, 1913 |
| 1,108,268 | Stahl | Aug. 25, 1914 |
| 1,184,238 | Hickey | May 23, 1916 |
| 1,246,527 | Bentson | Nov. 13, 1917 |
| 1,278,454 | French | Sept. 10, 1918 |
| 1,419,480 | White | June 13, 1922 |
| 1,484,841 | Monahan et al. | Feb. 26, 1924 |
| 1,560,370 | Bennett | Nov. 3, 1925 |
| 1,912,743 | Vaughn | June 6, 1933 |
| 1,917,508 | Dewind | July 11, 1933 |
| 1,959,768 | Seyferth et al. | May 22, 1934 |
| 2,252,837 | Dicke | Aug. 19, 1941 |